United States Patent
Lee (12)

(10) Patent No.: US 7,089,557 B2
(45) Date of Patent: Aug. 8, 2006

(54) DATA PROCESSING SYSTEM AND METHOD FOR HIGH-EFFICIENCY MULTITASKING

(76) Inventor: Rusty Shawn Lee, 1525 Wilder Ave. #606, Honolulu, HI (US) 96822

( * ) Notice: Subject to any disclaimer, the term of this patent is extended or adjusted under 35 U.S.C. 154(b) by 489 days.

(21) Appl. No.: 10/098,137

(22) Filed: Mar. 15, 2002

(65) Prior Publication Data

US 2002/0147758 A1  Oct. 10, 2002

Related U.S. Application Data

(60) Provisional application No. 60/282,650, filed on Apr. 10, 2001.

(51) Int. Cl.
*G06F 9/46* (2006.01)
*G06F 9/44* (2006.01)

(52) U.S. Cl. .................. 718/102; 718/100; 718/103; 718/107; 718/108; 717/106; 717/111

(58) Field of Classification Search ............ 718/100, 718/102–103, 107–108; 717/106, 111
See application file for complete search history.

(56) References Cited

U.S. PATENT DOCUMENTS

| | | | | |
|---|---|---|---|---|
| 6,148,325 A | * | 11/2000 | Schmidt et al. | 718/107 |
| 6,209,085 B1 | * | 3/2001 | Hammond et al. | 712/244 |
| 6,223,201 B1 | * | 4/2001 | Reznak | 718/102 |
| 6,256,659 B1 | * | 7/2001 | McLain et al. | 718/100 |
| 6,314,510 B1 | * | 11/2001 | Saulsbury et al. | 712/213 |
| 6,470,376 B1 | * | 10/2002 | Tanaka et al. | 718/108 |

OTHER PUBLICATIONS

Dawson R. Engler, "VCODE: a retargetable, extensible, very fast dynamic code generation system," published May 1996, p. 160-170.*
Liedtke, et al., "Achieved IPC Performance (Still The Foundation For Extensibility)," 6th Workshop on Hot Topics in Operating Systems (HotOS), May 1997, pp. 1-4.
Engler et al., "Exokernel: An Operating System Architecture for Application-Level Resource Management," *Proceedings of the Fifteenth Symposium on Operating Systems Principles*, Dec. 1995, pp. 1-16.
Poletto, et al., "C and tcc: A Language and Compiler for Dynamic Code Generation," ACM Transactions on Programming Languages and Systems 21(2), Mar. 1999, pp. 324-369.
Engler, D., "VCODE: A Retargetable, Extensible, Very Fast Dynamic Code Generation System" Proc. ACM SIGPLAN '96 Conference on Programming Design and Implementation, Phila., May 1996, pp. 160-170.

* cited by examiner

*Primary Examiner*—William Thomson
*Assistant Examiner*—Qing-Yuan Wu

(57) ABSTRACT

A method and data processing system are presented for multitasking a plurality of simultaneous tasks over one or more data processors. The invention significantly reduces the overhead required for multitasking without sacrificing responsiveness or flexibility. Both the number and length of context switches are reduced. The resulting environment is also capable of providing real-time operation and memory protection to tasks. No modifications to the tasks are required to make use of the invention.

20 Claims, No Drawings

DATA PROCESSING SYSTEM AND METHOD FOR HIGH-EFFICIENCY MULTITASKING

CROSS-REFERENCE TO RELATED APPLICATIONS

This application claims priority to U.S. Provisional Patent Application Ser. No. 60/282,650, filed Apr. 10, 2001.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

This invention relates to computer systems, and more particularly to multi-tasking.

The purpose of the invention is to increase the efficiency and flexibility of the execution of several tasks at once. Task scheduling is an important part of a modern computer system because it can have a large effect on performance. Presently, most task scheduling models fall into one of two general categories: preemptive multitasking and cooperative multitasking.

Preemptive multitasking is driven by allocating fixed amounts of processing time to each running task and saving and restoring all the necessary state information at the beginning and end of each time period. This saving and restoring process is known as a context switch. Because these context switches can occur at times when a process is in the middle of a number of operations, the amount of information saved and restored during a context switch can be very high. However, preemptive multitasking can ensure that no process takes time away from other processes or prevents other processes from running.

Cooperative multitasking relies on each process to voluntarily yield control of a processor to other tasks, typically to a scheduler that then transfers control to the next available task. Cooperative multitasking has the potential to be far more efficient than preemptive multitasking, since applications can be written to yield control in such a way that the number of context switches is minimized and at times when minimal context needs to be saved so that context switches that do occur will be much faster. However, improperly written or malicious code can cause cooperative multitasking to result in slow responses to external inputs or worse, the starvation of other tasks. Because of these impediments, preemptive multitasking has become the model of choice for most modern general-purpose operating systems and systems that require real-time performance.

What is needed is a way to combine the efficiency benefits of cooperative multitasking with the responsiveness of preemptive multitasking. Prior art attempts to do this have used both types of systems running simultaneously or one system running on top of the other, to allow the appropriate form of multitasking to be used for the appropriate category of tasks. However, this requires complex synchronization mechanisms (U.S. Pat. No. 6,148,325) and still requires a significant amount of context switching. In addition, the added complexity results in additional performance overhead (U.S. Pat. No. 6,223,201). It is highly desirable to reduce this overhead and the overhead of context switching.

Normally when a task scheduler executes on a data processor, it picks a task and calls the task for execution. When the task yields its time under a cooperative multitasking system or when a set amount of time has expired under a preemptive multitasking system, the scheduler is called again, at which point it calls the next task to execute. However, the overhead involved in returning control to the scheduler between each task adds a significant amount of time to each context switch. Furthermore, since most operating system schedulers execute in kernel mode, most operating system tasks must switch the processor to and from kernel mode as part of every context switch. Therefore, it is highly desirable to find a means for avoiding the additional overhead incurred by having the scheduler called during each context switch.

A large amount of prior art has attempted to reduce the amount of time required for context switches, by reducing the number of context switches that typically occur or by reducing the length of time of each context switch (U.S. Pat. No. 6,314,510 and Engler, D. R., Kaashoek, M. F., O'Toole, J. Jr., "Exokernel: an operating system architecture for application-specific resource management," Proceedings of the Fifteenth ACM Symposium on Operating Systems Principles, December 1995). The most effective prior art solutions require modifications to the hardware (U.S. Pat. No. 6,209,085), modifications of the tasks themselves, or specific hardware dependencies (Leidke, J., Elphinstone, K., Schnberg, S., Hrtig, H., Heiser, G., Islam, N., Jaeger, T., "Achieved IPC Performance," Proceedings of the Sixth Workshop on Hot Topics in Operating Systems, pp. 28–31, Cape Cod, Mass., May 1997). It is therefore desirable to achieve a significant reduction of context switch time transparently to the task author and user in a hardware-independent manner. It is also desirable to further decrease the overhead of context switching beyond the advancements of the prior art.

Some virtual machine and dynamic code generation prior art (Poletto, M., Hsieh, W. C., Engler, D. R., Kaashoek, M. F., "C and tcc: A language and compiler for dynamic code generation," ACM Transactions on Programming Languages and Systems 21(2), pp. 324–369, March 1999) has shown promise in performing optimizations on code. However, this prior art does not significantly reduce the amount of context switching, and actually increases the total amount of overhead to multitasking in most cases. Furthermore, the most effective prior art requires extensive modifications to the tasks by a skilled developer (Engler, D. R., "VCODE: a retargetable, extensible, very fast dynamic code generation system," Proceedings of the ACM SIGPLAN '96 Conference on Programming Design and Implementation (PLDI '96), Philadelphia, Pa., pp. 160–170, May 1996). It is therefore desirable to provide a means for optimizing code through the dynamic generation of code based on pre-existing tasks without requiring the developer or user to intervene.

BRIEF SUMMARY OF THE INVENTION

In accordance with one embodiment of the present invention is an operating system task scheduler that multiplexes a plurality of tasks over one or more hardware processors. The task scheduler generates code into a temporary buffer by copying code segments from each task. Each code segment is followed by any necessary code to preserve and restore a task's state information before proceeding to the next code segment. A data processor can execute the generated code from the buffer and achieve the same effect as a traditional scheduler. However, unlike the prior art, the present invention allows all of the scheduled tasks to execute without calling the scheduler in between each task. Furthermore, unlike the prior art, the processor does not need to switch from user mode to kernel mode and back at each context switch. These improvements significantly reduce the amount of time required for each context switch, making execution of the tasks much more efficient.

No modifications to the tasks by the user or developer are required to take advantage of the present invention, unlike much of the prior art. The current embodiment further provides additional functionality to executed code, such as a hard or soft real-time environment and memory protection. Prior art cannot provide such a rich set of features and efficiency without requiring extensive modification to the tasks or hardware.

The current embodiment can further reduce the length and frequency of context switching by optimizing the generated code. Unlike the prior art, no modifications to the tasks are necessary for said optimizations and they can significantly enhance the efficiency of running multiple simultaneous tasks beyond even cooperative multitasking systems.

BRIEF DESCRIPTION OF THE SEVERAL VIEWS OF THE DRAWING

Not Applicable.

DETAILED DESCRIPTION OF THE INVENTION

In accordance with one embodiment of the present invention is a task scheduler that achieves a high level of performance among multiple tasks running simultaneously by explicitly ordering the code of these tasks ahead of time.

The scheduler is implemented as a replacement for the existing scheduler in a computer operating system that uses preemptive multitasking. The operating system calls the scheduler at regular periodic intervals through clock interrupts. The scheduler saves the computer's registers in the context of the current task and determines the next task that should execute.

In the present embodiment, the scheduler maintains a list of all currently running processes and their priority levels. Execution time is divided into timeslices equally among all processes with the highest priority, while other processes are starved. In an alternative embodiment, the execution time is divided among multiple processes with different priorities by weighting the amount of execution time of each process according its priority.

After determining the execution time allotted to each running process, the scheduler goes through these processes one at a time and copies their code from the current point of execution to the point in the code of each process that will be reached at the end of that process' timeslice. Although hardware with real-time guarantees may allow this time to be computed exactly, with most hardware this will actually be an estimate. An estimate is computed for each segment of code between branches by adding together the average execution times of each instruction in the segment of code. The estimates are pre-computed when the program is loaded by the operating system and cached for future use. They can also be provided by a compiler or other program that pre-computes these estimates and tags the code with the appropriate information. The scheduler copies the code from the current execution point to the first branch point, then copies the code for each possible branch segment until the estimated times for the shortest sequences of branch segments from the first branch point are greater than or equal to the size of the timeslice of the process. For conditional branches, one branch segment is the code that is executed assuming the branch is taken through the code for the next branch instruction, and the other branch segment is the code that is executed assuming that the branch is not taken through the code for the next branch instruction. For non-conditional branches, also known as jumps, the branch only has one branch segment. Branch segments terminate before the next branch instruction if they contain code to yield the processor or if the location of the branch cannot be determined until runtime, assuming the branch is taken. On some hardware, this can also have the added benefit of reducing the overhead due to branching.

The code is copied to a reserved block of memory specifically allocated for the scheduler when the operating system is initialized. At the end of each possible point of termination for the code, code is inserted to jump to the next process. This includes the instructions to save the current context and address space, load the next process' context and address space, and the actual instruction to non-conditionally branch to the next process, if needed. The exception to this is when the termination point is due to a branch location that cannot be determined until the code is actually executed, in which case the code calls the scheduler instead. Under normal conditions, code segments are copied in order of execution, so few or no instructions are necessary to continue execution at the next process. In an alternative embodiment, each of these endpoints in the code are saved, and then modified in place instead of being copied. The original code is restored the next time the scheduler is called.

The scheduler continues copying code until it runs out of space in the reserved block of memory or until it has copied the code for processes for a specific amount of execution time. The default setting is to limit the copying to one second of execution time.

If a process is killed or generates an exception or blocks on the operating system, the operating system calls the scheduler. The code generated by the scheduler for calling the next process to be executed does not result in the scheduler being called by the operating system, since this code never calls the operating system to yield its processor time. However, the last process that is scheduled by the scheduler calls the scheduler at each of its termination points.

In the present embodiment, the scheduler is extremely flexible and can be set up to support a number of additional features. The scheduler can operate on virtual machine code instead of real machine instructions. With virtual machine code, the scheduler works in the exact same manner as described above, except that it is called by the virtual machine instead of the operating system. If a just-in-time compiler for the virtual machine is available, the scheduler can also be set up to call the just-in-time compiler to generate the copied code, instead of copying the code directly. In this case, the scheduler simply calls the just-in-time compiler on each branch segment instead of copying each branch segment.

The scheduler can also be set up to satisfy specified real-time constraints. Since the location of each jump to the next process at the end of each timeslice is fixed, at least to a small number of possibilities, guarantees on the maximum and minimum run-time can be made by adding together the run-times of the shortest or longest set of code segments. If a sequence of code could execute for more than a specified length of time, the termination points can be moved to earlier in the code to ensure that the maximum run-time of the code is within the specified time interval. The present embodiment achieves this by keeping track of the maximum run-time of each branch segment added to the copied code, and when a branch segment is added that increases this maximum run-time past the specified time interval, that branch segment is replaced with a termination point that behaves as the termination points described previously.

The scheduler can also be set up to add certain memory protection features to the copied code. In the present embodiment, the copied code is scanned for references to memory. Before each memory reference, instructions are added to check the value of the memory reference and branch to an operating system exception routine if such value is out of bounds of the program's allocated memory. The scheduler receives the current range of the program's allocated memory by querying the operating system, and the operating system updates this information when new memory is allocated by the program through the operating system. This allows programs running on environments without any explicit memory protection model to transparently benefit from memory protection without any effort or knowledge on the part of the developers of the programs. To ensure proper operation, using this feature requires that all memory or branch references to the code must be updated by the appropriate offset added by the additional instructions. The scheduler easily updates all addresses, relative and absolute, in the code. However, the code may also contain some irresolvable references to locations in the code, for example when branching to the address contained in a register at run-time. Since the scheduler does not know the value of this register until that point of execution is actually reached, the scheduler will not use the above memory protection features on code that contains such irresolvable references. However, on architectures that do not allow programs to access memory outside of their allocated memory blocks, the scheduler can simply add an additional instruction before the irresolvable code reference that adds the appropriate offset to the register containing the address of the irresolvable location in the code.

Another feature the scheduler can be set up to use is the optimization of context switching. The scheduler can minimize the amount of context switching that will occur by slightly moving forward the termination points in the copied code so that they occur just after code that is likely to block. Since code that blocks on the operating system results in the scheduler being called again anyway, placing a termination point right before such a potentially blocking call means the process will endure an extra context switch before the blocking call is executed. Furthermore, if the code is blocking on some external resource, it is possible that the resource will be ready by the time the other processes have finished their timeslices. If instead a context switch occurs before the code has a chance to block on the resource, the resource may be idle during the time until the process regains control and blocks, possibly resulting in wasted resources. To make the required adjustments, the scheduler scans the code immediately after each termination point. If one of the next five instructions can block on a resource or the operating system, the scheduler copies this additional code and moves the termination point forward to just after the blockable instruction. The termination point still occurs just after this instruction, so that if blocking does not occur, the code will still branch to the next process without intervention from the scheduler. Since the scheduler only slightly moves the termination points, the added execution time is imperceptible under normal conditions. However, for hard real-time systems such behavior may be undesirable, which is why this feature is an option rather than a default policy. Many other code optimizations well known in the art can be easily applied to the generated code.

The task scheduler can use all of the above features to minimize the amount of time spent context switching and can provide transparent software memory protection for programs. By decreasing the frequency with which the scheduler is called, as well as the overhead of context switching, the scheduler allows multiple processes to be run simultaneously in a more efficient manner than with traditional multitasking. Performing the above functions on a separate data processor or during idle times can further reduce the amount of overhead.

Those skilled in the art will recognize that the methods of the present invention may be incorporated as computer instructions stored as a computer program code means on a computer readable medium such as a magnetic disk, CD-ROM, and other media common in the art or that may yet be developed. Furthermore, important data structures found in computer hardware memory may be created due to operation of such computer program code means. The methods of the present invention may even be incorporated directly into a computer processor.

The foregoing description of one embodiment of the invention has been presented for the purposes of illustration and description. It is not intended to be exhaustive or to limit the invention to the precise form disclosed. Many modifications and variations are possible in light of the above teaching. The scope of the invention is, therefore, indicated by the appended claims rather than by the foregoing description. All changes which come within the meaning and range of equivalency of the claims are to be embraced within their scope.

I claim:

1. A method in a data processing system for dynamically executing a plurality of simultaneous tasks, said method comprising the steps of:
    identifying tasks that are available for execution;
    determining an order in which said identified tasks will execute;
    for each said identified task, generating a sequence of instructions based on instructions contained in each said identified task;
    for each said generated sequence of instructions:
        identifying one or more endpoints, wherein said endpoints mark possible termination points of each said generated sequence of instructions;
        generating any additional instructions needed for restoring any necessary state information; and
        for each said identified endpoint, generating any additional instructions needed for saving any necessary state information;
    generating an aggregate super sequence of instructions via ordering said identified tasks in the order determined in said determining step, the aggregate super sequence of instructions thereby including: said sequences of instructions generated for each identified task, any additional instructions needed for restoring any necessary state information and any additional instructions needed for saving any necessary state information; and
    executing the aggregate super sequence of instructions.

2. The method of claim 1, wherein said step of generating a sequence of instructions for each said identified task comprises copying appropriate sequences of instructions from said identified tasks.

3. The method of claim 1, wherein a length of each said generated sequence of instructions is determined via estimating a required amount of execution time.

4. The method of claim 3, wherein said estimating step comprises providing estimates which are maximum runtime guarantees calculated to provide a real-time environment.

5. The method of claim 1, further comprising the step of caching at least some of information used in generating the sequences of instructions.

6. The method of claim 1, wherein said step of generating a sequence of instructions for each said identified task comprises employing some information obtained from pre-computed data.

7. The method of claim 1, wherein said step of generating a sequence of instructions for each said identified task comprises generating sequences of instructions when each said identified task is loaded into memory.

8. The method of claim 1, wherein said step of determining an order in which said identified tasks will execute is performed by an operating system's scheduler.

9. The method of claim 1, further comprising the step of adjusting lengths of at least one of said generated sequences of instructions to reduce overhead in switching between tasks.

10. The method of claim 1, wherein the scheduler is a virtual machine.

11. The method of claim 1, wherein said step of generating a sequence of instructions for each identified task comprises generating sequences of instructions via a code translator or recompiler.

12. The method of claim 1, further comprising the step of generating any additional instructions necessary to enforce a memory protection model.

13. The method of claim 1, further comprising the step of optimizing said generated sequences of instructions to increase efficiency.

14. A data processing system for dynamically executing a plurality of simultaneous tasks, comprising:
    means for identifying tasks that are available for execution;
    means for determining an order in which said identified tasks will execute;
    means for generating, for each identified task, a sequence of instructions based on instructions contained in each said identified task;
    means for identifying, for each said generated sequence of instructions, one or more endpoints, wherein said endpoints mark possible termination points of each said generated sequence of instructions;
    means for generating, for each said generated sequence of instructions, any additional instructions needed for restoring any necessary state information;
    means for generating, for each said identified endpoint, any additional instructions needed for saving any necessary state information;
    means for generating an aggregate super sequence of instructions via ordering said identified tasks in the order determined by said determining means, the aggregate super sequence of instructions thereby including: said sequences of instructions generated for each identified task, any additional instructions needed for restoring any necessary state information and any additional instructions needed for saving any necessary state information; and
    means for executing the aggregate super sequence of instructions.

15. The system according to claim 14, further comprising means for estimating a required amount of execution time for a generated sequence of instructions.

16. The system according to claim 14, further comprising means for caching at least some information used in the generation of a sequence of instructions.

17. The system according to claim 14, wherein said means for generating instructions for each identified task further comprise means for reducing overhead in switching between tasks.

18. The system according to claim 14, wherein said means for generating a sequence of instructions for each identified task further comprises means for translating or recompiling instructions.

19. The system according to claim 14, further comprising means for generating any additional instructions necessary to enforce a memory protection model.

20. The method according to claim 1, further comprising the steps of:
    generating additional instructions needed, at possible termination points of the aggregate super sequence of instructions, for transferring execution of the aggregate super sequence of instructions to a scheduler; and
    thereafter transferring execution of the aggregate super sequence of instructions to a scheduler;
    said step of executing the aggregate super sequence of instructions comprising executing the aggregate super sequence of instructions with the scheduler.

* * * * *